US010949762B2

United States Patent
Ladha et al.

(10) Patent No.: US 10,949,762 B2
(45) Date of Patent: Mar. 16, 2021

(54) METHODS AND SYSTEMS FOR OPTIMIZING HIDDEN MARKOV MODEL BASED LAND CHANGE PREDICTION

(71) Applicant: Tata Consultancy Services Limited, Mumbai (IN)

(72) Inventors: Shamsuddin Nasiruddin Ladha, Pune (IN); Piyush Yadav, Pune (IN); Shailesh Shankar Deshpande, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 612 days.

(21) Appl. No.: 15/271,913

(22) Filed: Sep. 21, 2016

(65) Prior Publication Data
US 2017/0091641 A1 Mar. 30, 2017

(30) Foreign Application Priority Data
Sep. 30, 2015 (IN) .................... IN3721/MUM/2015

(51) Int. Cl.
*G06N 7/00* (2006.01)
*G06N 20/00* (2019.01)

(52) U.S. Cl.
CPC ............. *G06N 7/005* (2013.01); *G06N 20/00* (2019.01)

(58) Field of Classification Search
CPC ............................ G06N 7/005; G06N 20/00
See application file for complete search history.

(56) References Cited

U.S. PATENT DOCUMENTS 6,856,973 B1 * 2/2005 Bott ....................... G06Q 40/00
705/35
8,958,603 B2 * 2/2015 Boriah ................. G06K 9/0063
382/109

(Continued)

FOREIGN PATENT DOCUMENTS

| CN | 101763600 A | 6/2010 |
| CN | 101807218 A | 8/2010 |
| KR | 101293906 B1 * | 8/2013 |

OTHER PUBLICATIONS

R. C. Vasko, A. El-Jaroudi and J. R. Boston, "An algorithm to determine hidden Markov model topology," 1996 IEEE International Conference on Acoustics, Speech, and Signal Processing Conference Proceedings, Atlanta, GA, USA, 1996, pp. 3577-3580 vol. 6. (Year: 1996).*

(Continued)

*Primary Examiner* — Michael J Huntley
*Assistant Examiner* — Ahsif A. Sheikh
(74) *Attorney, Agent, or Firm* — Finnegan, Henderson, Farabow, Garrett & Dunner, LLP

(57) ABSTRACT

The present disclosure provides a method and a system for optimizing Hidden Markov Model based land change prediction. Firstly, remotely sensed data is pre-processed and classified into a plurality of land use land cover classes (LULC). Then socio-economic driver variables data for a pre-defined interval of time are provided from a database. A Hidden Markov Model (HMM) is defined with LULC as hidden states and socio-economic driver variables data as observations and trained for generating a MINI state transition probability matrix. Again the defined MINI is trained by taking input data from scenario based temporal variables to generate another set of HMM state transition probability matrix. The generated MINI state transition probability matrix is then integrated with a spatio-temporal model to (Continued)

obtain an integrated model for predicting LULC changes to generate at least one prediction image.

13 Claims, 3 Drawing Sheets

(56)  References Cited

U.S. PATENT DOCUMENTS

| | | | | |
|---|---|---|---|---|
| 9,852,344 | B2* | 12/2017 | Dunlop | G06K 9/00718 |
| 2014/0046872 | A1* | 2/2014 | Arnott | G06Q 40/06 |
| | | | | 705/36 R |
| 2014/0164072 | A1* | 6/2014 | Kulusjarvi | G06Q 10/10 |
| | | | | 705/7.39 |
| 2014/0212055 | A1 | 7/2014 | Boriah et al. | |
| 2014/0297334 | A1* | 10/2014 | Hibbert | G06Q 40/08 |
| | | | | 705/4 |
| 2015/0071528 | A1* | 3/2015 | Marchisio | G06K 9/6269 |
| | | | | 382/159 |

OTHER PUBLICATIONS

J.-F. Mari, Temporal and spatial data mining with second-order hidden markov models, 2005, Soft Comput, pp. 406-414. (Year: 2005).*

R. C. Vasko, A. El-Jaroudi and J. R. Boston, "An algorithm to determine hidden Markov model topology," 1996 IEEE International Conference on Acoustics, Speech, and Signal Processing Conference Proceedings, Atlanta, GA, USA, 1996, pp. 3577-3580 vol. 6. (Year: 1996).*

Severino Romano, Post-2013 EU Common Agricultural Policy: predictive models of land use change, 2013, University of Basilicata, Italy, pp. 151-172. (Year: 2013).*

Van Vuuren, D.P., Edmonds, J., Kainuma, M. et al. The representative concentration pathways: an overview. Climatic Change 109, 5 (2011). pp. 5-30. (Year: 2011).*

Bhagat, Vijay. (2012). Use of Remote Sensing Techniques for Robust Digital Change Detection of Land: A Review. Recent Patents on Space Technology. 2. 123-144. 10.2174/1877611611202020123. (Year: 2012).*

Romano, S. et al., "Post-2013 EU Common Agricultural Policy: predictive models of land use change", Firenze University Press, Bio-based and Applied Economics 2(2), pp. 151-172, Jul. 2013.

Al-Talib, Dr. Ghayda A., et al., "Land Cover Classification Using Hidden Markov Models", International Journal of Computer Networks and Communications Security, vol. 1, No. 4, pp. 165-172, Sep. 2013.

Ting Liu et al., "Land Change Modeling: Status and Challenges", Chapter 1, pp. i-xi and 1-16, Monitoring and Modeling of Global Changes: A Geomatics Perspective, Springer Science+Business Media, Editors Li and Yang, 2015.

* cited by examiner

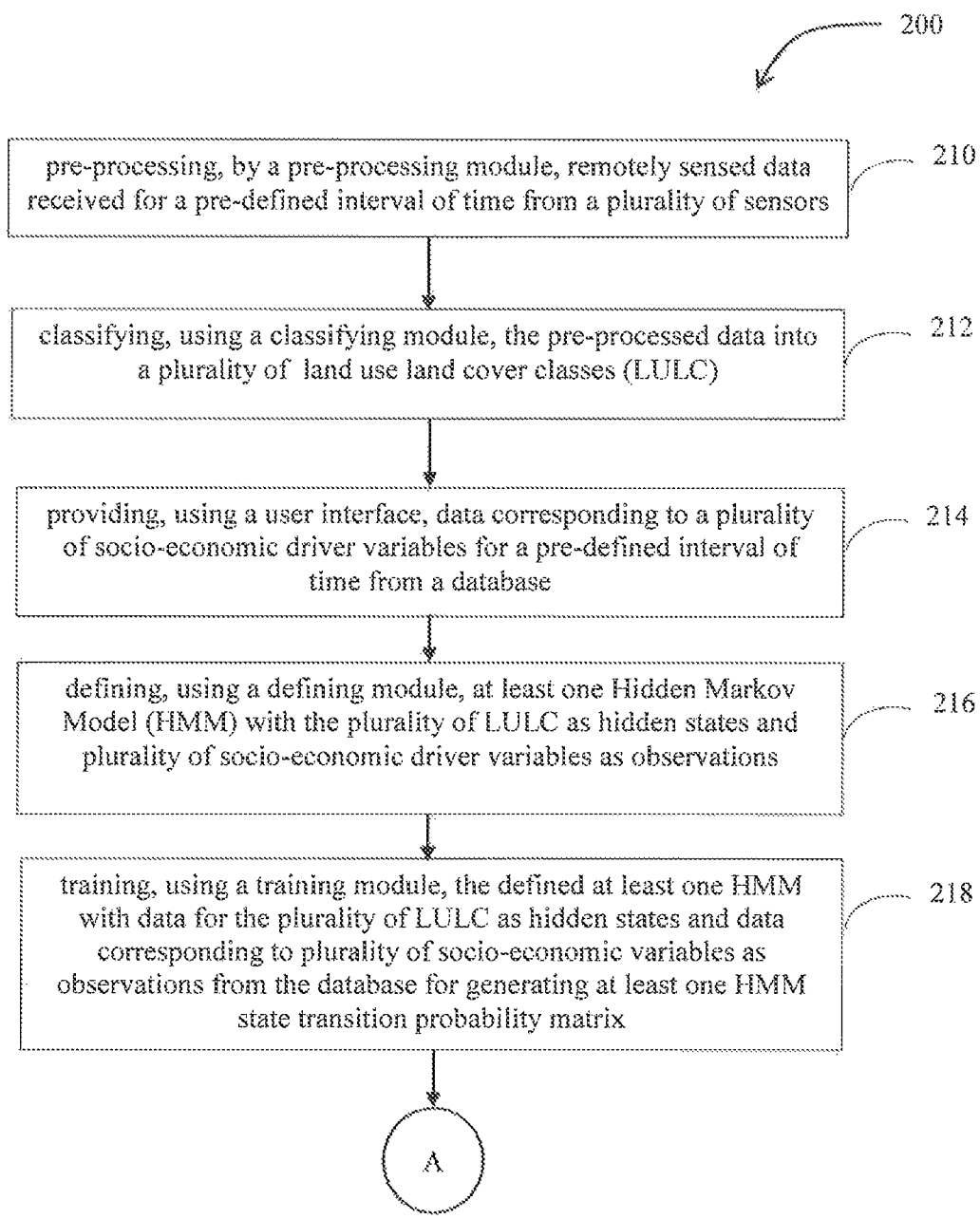
FIG. 2 (Contd.)

METHODS AND SYSTEMS FOR OPTIMIZING HIDDEN MARKOV MODEL BASED LAND CHANGE PREDICTION

PRIORITY CLAIM

This U.S. patent application claims priority under 35 U.S.C. § 119 to: Indian Application No. 3721MUM2015 filed on 30 Sep. 2015. The entire contents of the aforementioned application are incorporated herein by reference.

TECHNICAL FIELD

The embodiments herein generally relate to modelling of land use and land cover changes and more particularly to methods and systems for optimizing Hidden Markov Model based land change prediction.

BACKGROUND

With ever increasing urbanization along with the rise of world population, predicting land changes or land use land cover (LULC) changes has emerged as an important tool for modelling urban growth. Urban growth modelling is of prime importance in the contemporary context due to complex interactions between urban growth, economic development, and human society at large. Unplanned urban growth has resulted in several dire consequences such as environmental degradation; loss of biodiversity; natural disasters such as flash floods and landslides; etc. These effects are compounded, especially in developing countries, where urban modeling, planning and decision making have not made to the forefront of the development agenda for various reasons. Due to the predominantly irreversible nature of these effects sustainable and holistic urban development is the need of the time. A key aspect of urban growth modeling is the prediction of LULC changes.

Urban growth can be considered as an active process. Urban growth models typically model this process taking into account the underlying driving factors on which the process depends, to predict changes in urban growth. These factors are generally classified as either temporal, or spatial, or spatio-temporal. Temporal factors are dynamic with respect to time but generally spatially static for a given area under study. Spatial factors, for example Digital Elevation Model (DEM), are spatially varying but relatively static with respect to time. Spatio-temporal factors, for example proximity to primary roads, are dynamic with respect to both time and space.

In literatures, Markov Chain (MC) has been extensively used to model rate of land use land cover changes. MC is a stochastic model. MC model is completely specified by a set of states and a transition probability matrix. The set of states correspond to different land use land cover types. These states are directly observable. The transition probability matrix represents probability of transitioning from one state to another over discrete time steps. As MC is a temporal model it cannot predict spatial co-ordinates of change. Hence, MC has been integrated with other spatio-temporal models to model both spatial and temporal patterns of LULC changes. The integrated models are more effective than standalone models due to complementary nature of the underlying models.

On the flip side, MC model is severely constrained as it does not model underlying temporal factors. Prediction of future growth rate is inaccurate with MC. Since the MC model is built purely from cross tabulation of transition frequencies from existing land cover images, future transition probabilities have to be estimated only from the existing data. Many ad hoc approaches have been suggested to model future transition probabilities. These approaches although based on mathematics are far away from reality. For example, in one approach some elements of the transition probability matrix for the future time period are derived based on the simple power law.

Furthermore, the MC model does not allow modeling of underlying temporal variables or factors such as macroeconomic factors, socio-economic factors, etc. Generally, these factors do not vary spatially for typical urban regions for which growth predictions are undertaken. The net effect of this shortcoming of MC is that temporal factors remain outside the purview of the modeling process. This shortcoming naturally propagates to MC based integrated models such as MC-Cellular Automata that can only model spatial or spatio-temporal factors. This translates to lesser accurate prediction results. Hence it is a challenge to be able to incorporate all possible factors such as spatial, spatio-temporal along with temporal factors for an optimized and richer land change prediction model.

SUMMARY

Embodiments of the present disclosure present technological improvements as solutions to one or more of the above-mentioned technical problems recognized by the inventors in conventional systems.

The instant disclosure provides methods and systems for optimizing Hidden Markov Model based land change prediction. In an aspect there is provided a method for optimizing Hidden Markov Model based land change prediction, the method comprising: pre-processing, by a pre-processing module, remotely sensed data received for a pre-defined interval of time from a plurality of sensors; classifying, using a classifying module, the pre-processed data into a plurality of land use land cover classes (LULC); providing, using a user interface, data corresponding to a plurality of socio-economic driver variables for a pre-defined interval of time from a database; defining, using a defining module, at least one Hidden Markov Model (HMM) with the plurality of LULC as hidden states and plurality of socio-economic driver variables as observations; training, using a training module, the defined at least one HMM with data for the plurality of LULC as hidden states and data corresponding to plurality of socio-economic driver variables as observations from the database for generating at least one HMM state transition probability matrix; generating, using a scenario generating module, data corresponding to a plurality of scenario based temporal variables and storing the data corresponding to a plurality of scenario based temporal variables in the database; training, using the training module, the defined HMM with data for the plurality of LULC as hidden states and data corresponding to a plurality of scenario based temporal variables from the database as observations for generating at least one another set of HMM state transition probability matrix; integrating, using an integrating module, the generated at least one HMM state transition probability matrix or the generated at least one another set of HMM state transition probability matrix with at least one spatio-temporal model to obtain at least one integrated model; and predicting, using a predicting module, LULC changes to generate at least one prediction image.

In an embodiment, the step of classifying the pre-processed data into the plurality of LULC comprises classifying the pre-processed data into landscape based classes.

In an embodiment, the method described herein above comprises mean normalizing the data corresponding to the plurality of socio-economic driver variables and the data corresponding to a plurality of scenario based temporal variables to a uniform scale between 0 and 1. In an embodiment, the method described herein above wherein the mean normalized data is stored as Gaussian distributions in a database.

In an embodiment, the step of generating a plurality of scenario based temporal variables comprises defining scenarios in terms of quartiles of the provided socio-economic driver variables.

In an embodiment, the step of integrating comprises providing data from the generated at least one HMM transition matrix or the generated at least one another HMM transition matrix to a spatio-temporal modeler module wherein the spatio-temporal modeler comprises at least one spatio-temporal model.

In an embodiment, the step of predicting comprises generating a prediction image obtained by executing the obtained integrated model.

In an embodiment, the method described herein above further comprises training the defined HMM without at least one socio-economic driver variable to generate at least one pruned HMM transition matrix; comparing the generated at least one pruned HMM transition matrix with the generated at least one HMM transition matrix obtained from training the defined HMM with LULC as hidden states and socio-economic driver variables as observations; pruning the at least one socio-economic driver variable for a subsequent training of the defined HMM, when the generated at least one pruned HMM transition matrix is identical to the generated at least one HMM transition matrix.

In an aspect there is provided a system for optimizing Hidden Markov Model based land change prediction, the system comprising: one or more processors; a communication interface device; one or more internal data storage devices operatively coupled to the one or more processors for storing: a pre-processing module configured to pre-process remotely sensed data received for a pre-defined interval of time from a plurality of sensors; a classifying module configured to classify the pre-processed data into a plurality of land use land cover classes (LULC); a user interface configured to provide data corresponding to a plurality of socio-economic driver variables for a pre-defined interval of time from a database; a defining module configured to define at least one Hidden Markov Model (HMM) with the plurality of LULC as hidden states and plurality of socio-economic driver variables as observations; a training module configured to train the defined at least one HMM with data for the plurality of LULC as hidden states and data corresponding to plurality of socio-economic driver variables as observations from the database for generating at least one HMM state transition probability matrix; a scenario generating module is configured to generate data corresponding to a plurality of scenario based temporal variables and storing the data corresponding to a plurality of scenario based temporal variables in the database; the training module configured to train the defined at least one HMM with data for the plurality of LULC as hidden states and data corresponding to a plurality of scenario based temporal variables from the database as observations for generating at least one another set of HMM state transition probability matrix; an integrating module configured to integrate the generated at least one HMM state transition probability matrix or the generated at least one another set of HMM state transition probability matrix with at least one spatio-temporal model to obtain at least one integrated model; and a predicting module configured to predict LULC changes to generate at least one prediction image.

In an embodiment, the system described herein above further comprises a pruning module configured to: train the defined HMM without at least one socio-economic driver variable to generate at least one pruned HMM transition matrix; compare the generated at least one pruned HMM transition matrix with the generated at least one HMM transition matrix obtained from training the defined HMM with LULC as hidden states and socio-economic driver variables as observations; prune the at least one socio-economic driver variable for a subsequent training of the defined HMM, when the generated at least one pruned HMM transition matrix is identical to the generated at least one HMM transition matrix.

In another aspect, there is provided a computer program product comprising a non-transitory computer readable medium having a computer readable program embodied therein, wherein the computer readable program, when executed on a computing device, causes the computing device to: pre-process remotely sensed data received for a pre-defined interval of time from a plurality of sensors; classify the pre-processed data into a plurality of land use land cover classes (LULC); provide data corresponding to a plurality of socio-economic driver variables for a pre-defined interval of time from a database; define at least one Hidden Markov Model (HMM) with the plurality of LULC as hidden states and plurality of socio-economic driver variables as observations; train the defined at least one HMM with data for the plurality of LULC as hidden states and data corresponding to plurality of socio-economic driver variables as observations from the database for generating at least one HMM state transition probability matrix; generate data corresponding to a plurality of scenario based temporal variables and store the data corresponding to a plurality of scenario based temporal variables in the database; train the defined at least one HMM with data for the plurality of LULC as hidden states and data corresponding to a plurality of scenario based temporal variables from the database as observations for generating at least one another set of HMM state transition probability matrix; integrate the generated at least one HMM state transition probability matrix or the generated at least one another set of HMM state transition probability matrix with at least one spatio-temporal model to obtain at least one integrated model; and predict LULC changes to generate at least one prediction image.

It is to be understood that both the foregoing general description and the following detailed description are exemplary and explanatory only and are not restrictive of the invention, as claimed.

BRIEF DESCRIPTION OF THE DRAWINGS

The embodiments herein will be better understood from the following detailed description with reference to the drawings, in which.

It should be appreciated by those skilled in the art that any block diagram herein represents conceptual views of Illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
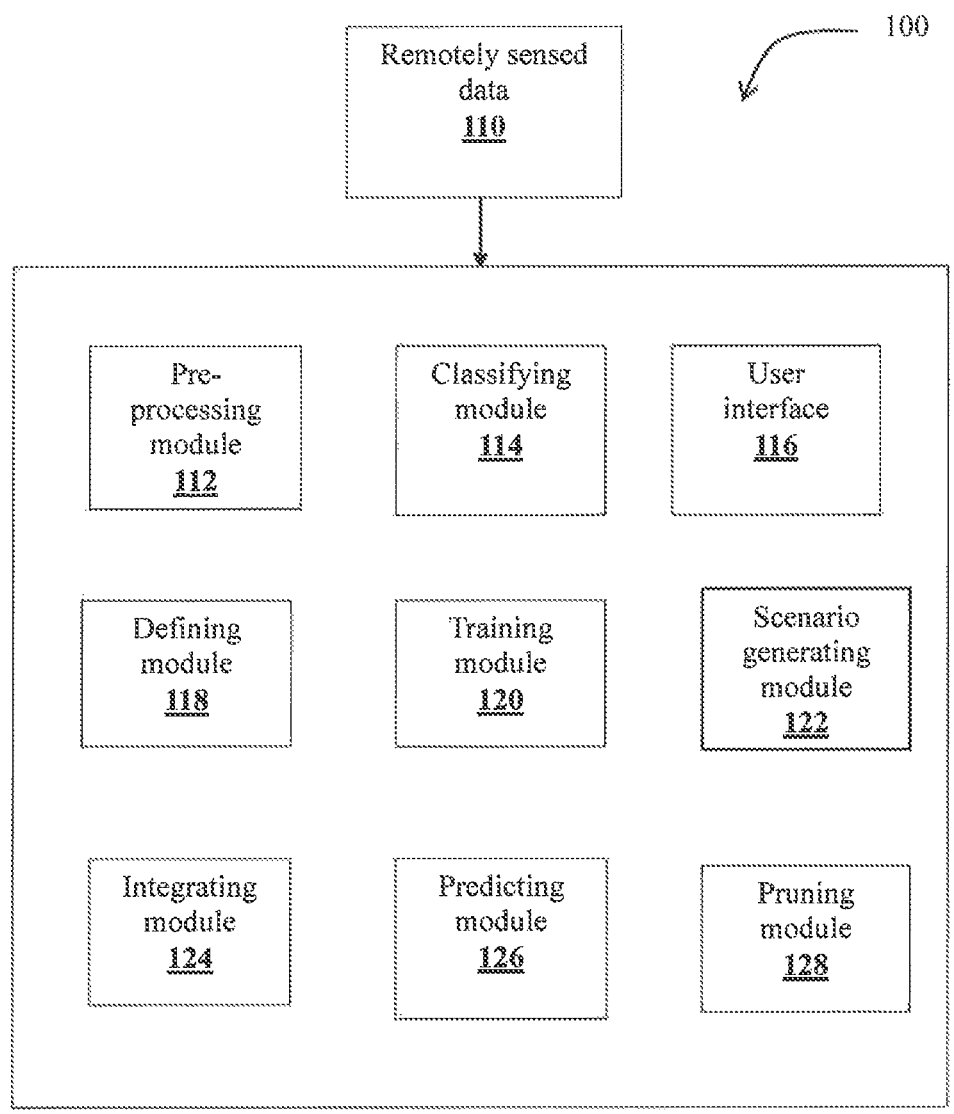
FIG. 1 an exemplary block diagram of a system for predicting land use land cover changes in accordance with an embodiment of the present disclosure.
Figure 2:
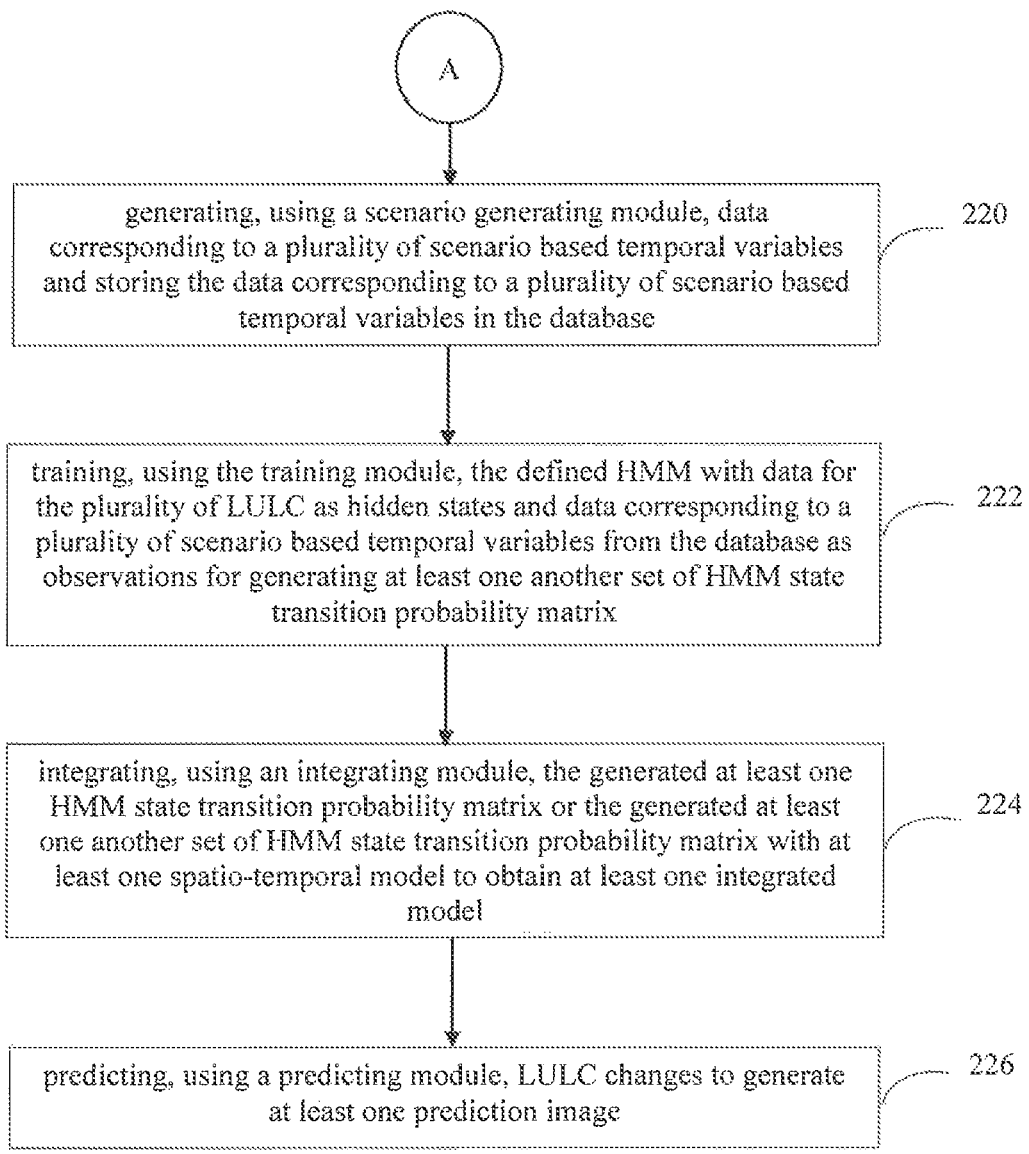
FIG. 2 is an exemplary flow diagram illustrating a computer implemented method for predicting land use land cover changes using the system of FIG. 1 in accordance with an embodiment of the present disclosure.

Referring now to the drawings, and more particularly to FIGS. 1 and 2, where similar reference characters denote corresponding features consistently throughout the figures, there are shown preferred embodiments and these embodiments are described in the context of the following exemplary system and method.

In accordance with an embodiment of the present disclosure, FIG. 1 illustrates an exemplary block diagram of system 100 for optimizing Hidden Markov Model based land change prediction. In accordance with an embodiment of the present disclosure FIG. 2 is an exemplary flow diagram illustrating a computer implemented method 200 for optimizing Hidden Markov Model based land change prediction using the system of FIG. 1 The steps of method 200 of the present disclosure will now be explained with reference to the components of system 100 as depicted in FIG. 1 for optimizing Hidden Markov Model based land change prediction. In an embodiment, system 100 includes one or more processors (not shown), communication interface or input/output (I/O) interface (not shown), and memory or one or more internal data storage devices (not shown) operatively coupled to the one or more processors. The one or more processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, system 100 can be implemented on a server or in a variety of computing systems, such as a laptop computer, a desktop computer, a notebook, a workstation, a mainframe computer, a server, a network server, cloud, hand-held device and the like.

The I/O interface can include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface can include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the various modules of system 100 can be stored in the memory.

Referring to FIGS. 1 and 2, at step 210, a pre-processing module 112, can pre-process remotely sensed data 110 received for a pre-defined interval of time from a plurality of sensors (not shown). Typically, the remotely sensed data 110 comprises panchromatic, multi-spectral, hyper spectral, LIDAR (Light Imaging, Detection, And Ranging) data or any other data of such nature. In an embodiment, pre-processing comprises any correction method known in the art such as Scan Line Correction, Atmospheric correction, Radio metric correction, etc.

At step 212, classification module 114, can classify the pre-processed data into a plurality of land use land cover classes (LULC). The pre-processed data is classified into landscape based classes. In accordance with an embodiment, the pre-processed data is classified initially into seven broad classes on the basis of the nature of the landscape. These classes may comprise any of Forest Canopy, Agriculture Area, Residential Area, Industrial Area, Common Open Area, Burnt Grass, Bright Soil and Water Body. A labeled set of pixels for each class of interest can be collected for example 500 to 3000 samples per class. A feature vector for each pixel can consist of all classified landscapes. Further, this set can be split into train and test datasets. In an embodiment, a standard Support Vector Machine (SVM) classifier is trained using the train datasets to classify the pre-processed data. Following that the classes are grouped into three high level classes namely, Vegetation, Impervious Surface, and Soil.

Alternatively, in an embodiment, the step 210 of pre-processing remotely sensed data 110 may be optional, and at step 212, classification module 114, can classify the remotely sensed data 110 into a plurality of land use land cover classes (LULC).

At step 214, data corresponding to a plurality of socio-economic driver variables for a pre-defined interval of time is provided using a user interface 116 from a database. The socio-economic driver variables can comprise a plurality of variables such as Gross Domestic Product, Interest Rate Cycle, Consumer Price Index Inflation, Gross Fixed Capital Formation, Urban Population Growth Rate, Per Capita Electricity Consumption, Total Road Length Added and such other variables. The data corresponding to the plurality of socio-economic driver variables are mean normalized to a uniform scale between 0 and 1 and then stored as Gaussian distributions.

At step 218, defining module 118, can define at least one Hidden Markov Model (HMM) with the plurality of LULC as hidden states and plurality of socio-economic driver variables as observations. An HMM is a doubly stochastic model that is defined by a set of hidden states and a set of observations. The hidden process is observed through another set of stochastic processes i.e., temporal factors that give rise to observations. In accordance with an embodiment, the HMM is defined by the classified land use land cover classes, Vegetation (V), Impervious Surface (I), and Soil (S) as hidden states and the mean normalized Gaussian distributions as observations. In accordance with an embodiment, observations are taken for a pre-defined period of time.

At step 218, a training module 120 can train the defined at least one HMM with data for the plurality of LULC as hidden states and data corresponding to plurality of socio-economic driver variables as observations from the database for generating at least one HMM state transition probability matrix. In accordance to an embodiment, the HMM can be trained using Baum-Welch or similar other expectation maximization algorithm. HMM can be initialized with Markov Chain transition probabilities for the pre-defined interval of time.

At step 220, a scenario generating module 122 can generate data corresponding to a plurality of scenario based temporal variables and storing the data corresponding to a plurality of scenario based temporal variables in the database. In accordance to an embodiment, scenario based temporal driver variables can be variables related to future growth scenarios, steady or negative economic growth or recession etc. The data corresponding to the plurality of scenario based temporal variables are mean normalized to a uniform scale between 0 and 1 and stored as Gaussian distributions. As indicated earlier, each socio-economic driver variable is modeled as a Gaussian distribution with a mean and a standard deviation. Now each such Gaussian distribution is divided into quartiles. Scenarios such as are rapid economic growth are defined in terms of the quartile numbers of all the variables. Then the data values for a given scenario are created by generating random numbers from the specified quartiles of socio-economic driver variables.

At step 222, the training module 120 can train the defined HMM with data for the plurality of LULC as hidden states and data corresponding to a plurality of scenario based temporal variables from the database as observations for generating at least one another set of HMM state transition probability matrix.

At step 224, an integrating module 124 can integrate the generated at least one HMM state transition probability matrix or the generated at least one another set of HMM state transition probability matrix with at least one spatio-temporal model to obtain at least one integrated model. The step of integrating comprises providing data from the generated HMM transition matrix to a spatio-temporal modeler module. A spatio-temporal modeler module comprises at least one spatio-temporal model. A spatio-temporal model deploys spatio-temporal suitability factors such as Digital Elevation Model, proximity to primary roads, slope, etc., to model urban growth scenario. In accordance with an embodiment, the at least one spatio-temporal model can be a Logistic Regression model or Cellular Automata or any other model of such nature.

At step 226, a predicting module 126 can predict LULC changes to generate at least one prediction image.

In another aspect of the present disclosure, some of the socio-economic driver variables can be pruned if there is no impact of such variables on the final prediction results. As a step for the method of pruning the socio-economic driver variables initially the defined HMM is trained without at least one socio-economic driver variable to generate at least one pruned HMM transition matrix then the generated at least one pruned HMM transition matrix is compared with the generated at least one HMM transition matrix obtained from training the defined HMM with LULC as hidden states and socio-economic driver variables as observations. Finally, the at least one socio-economic driver variable is pruned for a subsequent training of the defined HMM, when the generated at least one pruned HMM transition matrix is identical to the generated at least one HMM transition matrix. Pruning of socio-economic driver variables is hence achieved by initially training the HMM with all the selected socio-economic driver variables as shown in step 218. After the training, impact of each socio-economic driver variable is assessed by training the HMM again without that socio-economic driver variable. In an embodiment, if the re-trained HMM parameters are similar to the initially trained HMM then the variable is assumed to have little or no impact on HMM training and is dropped from consideration.

Experimental Results

In an embodiment, the HMM described in the present disclosure is implemented using Python Programming Language. A Gaussian Hidden Markov Model (HMM) library of Scikit-learn to conduct Hidden Markov Model experiments and Terrset' for land change modelling experiments was employed. The Terrset's Land Change Modeler comprises at least one saptio-temporal model for example Logistic Regression, cellular automata and the like. The experiments were conducted on a standard Intel Core2Duo machine with Windows 7 Professional and 2 GB RAM. The experiment was conducted to indicate the increased accuracy of implementing HMM over conventional Markov Chain implementation.

An HMM was trained with three hidden states (Vegetation-V, Impervious Surface-I, and Soil-S) and socio-economic driver variables as observations. Socio-economic driver variables can be obtained from various growth factors as shown in Table 1 below:

TABLE 1

Growth factors with their type and Scale.

| Growth Factors | Type | Scale |
| --- | --- | --- |
| Gross Domestic Product | Socio-Economic | National |
| Interest Rate Cycle | Socio-Economic | National |
| Consumer Price Index Inflation | Socio-Economic | National |
| Gross Fixed Capital Formation | Socio-Economic | National |
| Urban Population Growth Rate | Social | National |
| Per Capita Electricity Consumption | Socio-Economic | Regional |
| Total Road Length Added | Socio-Economic | Regional |

For experimentation, growth factors of multiple scale, i.e., national, regional, socio-economic and social indicators for period of 2001 to 2014 are taken.

The first step was to learn the model from the observations. For this purpose, observations from the year 2001 to 2014 was used as a training set. The observations were modelled as Gaussian distribution. HMM was initialized with MC transition probabilities for the year 2001 to 2009 (exemplary data for the year 2002 is shown in table 2 below):

TABLE 2

Actual Markov Chain Transition Probabilities for 2002

| Given LC class (2001) | Changed to LC class (2002) | | |
|---|---|---|---|
| | V | I | S |
| V | 0.7920 | 0.1067 | 0.1013 |
| I | 0.0503 | 0.8996 | 0.0501 |
| S | 0.3058 | 0.1321 | 0.5621 |

The conventional method of implementing Markov Chain transition probabilities were obtained using TerrSet's Markov module. The initial hidden state occupancy probability was obtained from frequency count of classified land use land cover states of 2001.

In an embodiment, the HMM was learnt using Baum-Welch algorithm. For learning the model the number of observations were increased. All the yearly observations were repeated six times (as if they were bi-monthly observations). Since Baum-Welch algorithm is prone to local minima, a stable model was obtained empirically after 50000 iterations with a threshold of less than 0.01. Table 3 shows the transition probability matrix of the HMM.

TABLE 3

Learned Hidden Markov Model transition probabilities 2014

| Given LC class (2001) | Changed to LC class (2014) | | |
|---|---|---|---|
| | V | I | S |
| V | 0.8710 | 0.0030 | 0.1260 |
| I | 0.0001 | 0.9610 | 0.0389 |
| S | 0.0020 | 0.1710 | 0.8270 |

TABLE 4

Computed MC transition probabilities for 2014

| Given LC class (2001) | Changed to LC class (2014) | | |
|---|---|---|---|
| | V | I | S |
| V | 0.6787 | 0.1661 | 0.1542 |
| I | 0.1538 | 0.6484 | 0.1978 |
| S | 0.1372 | 0.0863 | 0.7765 |

Comparing the transition probabilities in accordance to the embodiments of the present disclosure using Hidden Markov Model and the conventional method of using Markov Chain (Table 3 and Table 4 respectively), it was found that in Markov Chain persistence of the classified land use land cover states i.e., transition from a state to itself, decreases as the prediction period increases. This undesired loss of persistence of urban states is not seen in the Hidden Markov Model.

For the land use land cover change experiment, Terrset's Land Change Modeler was used. Land cover images of the year 2001 and 2009 were used for modelling. Transition sub-models were defined for six Land cover change types (V to S, V to I, I to V, I to S, S to V, S to I) excluding transitions from or to water states. Digital Elevation Model and road layers were used as the primary driver variable for each of the transition sub-models. The driver variables were transformed to respective evidence likelihood based transition potential images and fed into the spatio-temporal model, which in this case was Logistic Regression (LR) modeler to yield a consolidated potential transition image, one for each of the six land cover change types. For predicting the change, given the prediction year (2014), the Terrset's Land Change Modeler automatically generates a Markov Chain matrix as shown in table 4 and on execution a prediction image is generated by the Terrset's Land Change Modeler. Now, to predict change using HMM transition probability matrix, values from table 3 are used as input to the Terrset Land change modeler and similarly on execution a prediction image is obtained which is visually more accurate in comparison to conventional Markov chain based prediction image. For instance in Markov Chain based prediction images, many local regions are represented with errors like greatly reduced or significantly pronounced urban areas. An HMM based prediction image is well balanced and resembles more closely to actual output conditions.

As part of further experimental analysis, table 5 and table 6 below show the confusion matrix with precision and recall values for the predicted output using HMM and MC respectively.

TABLE 5

Confusion Matrix with Precision and Recall (HMM-Logistic Regression)

| Given LC class (2001) | Changed to LC class (2014) | | |
|---|---|---|---|
| | V | I | S |
| V | 264496 | 90361 | 202260 |
| I | 56671 | 297619 | 216563 |
| S | 230723 | 218469 | 635706 |
| Precision (V, I, S) | 0.48 | 0.49 | 0.60 |
| Recall (V, I, S) | 0.48 | 0.52 | 0.59 |

TABLE 6

Confusion Matrix with Precision and Recall (MC-Logistic Regression)

| Given LC class (2001) | Changed to LC class (2014) | | |
|---|---|---|---|
| | V | I | S |
| V | 221295 | 130697 | 205133 |
| I | 103953 | 183604 | 283296 |
| S | 332399 | 168167 | 584334 |
| Precision (V, I, S) | 0.54 | 0.38 | 0.34 |
| Recall (V, I, S) | 0.54 | 0.32 | 0.39 |

The results obtained from HMM improve prediction accuracy by a formidable margin. For instance, 11% increment in precision of the persistence of Impervious Surface (I) is observed. Hence an optimized or more accurate HMM based land change prediction output is obtained.

Although the description is directed towards integrating the trained Hidden Markov Model with Logistic Regression modelling, it may be understood that systems and methods of the instant disclosure can be applied to other spatio-temporal models, for instance Cellular Automata as defined herein above.

The written description describes the subject matter herein to enable any person skilled in the art to make and use the embodiments of the invention. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A method comprising:

classifying remotely sensed data received for a predefined interval of time from a plurality of sensors into a plurality of land use land cover classes (LULC) as Vegetation (V), Impervious Surface (I), and Soil (S);

providing, using a user interface, data corresponding to a plurality of socio-economic driver variables for a predefined interval of time from a database, wherein the plurality of socio-economic driver variables include a Gross Domestic Product of a scale as national, an Interest Rate Cycle of a scale as national, a Consumer Price Index Inflation of a scale as national, a Gross Fixed Capital Formation of a scale as national, an Urban Population Growth Rate of a type social and a scale as national, a Per Capita Electricity Consumption of a scale as regional, a Total Road Length Added of a scale as regional;

defining at least one Hidden Markov Model (HMM) with the plurality of LULC classes of V, I, S as hidden states and the plurality of socio-economic driver variables as observations, wherein each of the socio-economic driver variables is modeled as a Gaussian distribution with a mean and a standard deviation, and each Gaussian distribution is divided into quartiles;

training the defined at least one HMM with data for the plurality of LULC classes V, I, S as hidden states and the data corresponding to plurality of socio-economic driver variables as observations from the database for generating at least one HMM state transition probability matrix wherein a plurality of transition sub-models are defined for land cover change types as V to S, V to I, I to V, I to S, S to V, S to I excluding transitions from or to water states and a digital elevation model, road layers are used as a driver variable for each of the transition sub-models, wherein the driver variables are transformed to respective evidence likelihood based transition potential images and fed into a spatio-temporal model to yield a consolidated potential transition image for each of the land cover change types;

generating data corresponding to a plurality of scenario based temporal variables related to future growth scenarios, steady or negative economic growth, or recession and storing the data corresponding to a plurality of scenario based temporal variables in the database, wherein the plurality of scenario based temporal variables are defined in terms of quartile numbers, and data values for the scenario are created by generating random numbers from the specified quartiles of the socio-economic driver variables;

training the defined at least one HMM with data for the plurality of LULC classes V, I, S as hidden states and the data corresponding to a plurality of scenario based temporal variables from the database as observations for generating at least one other set of HMM state transition probability matrix;

integrating the generated at least one HMM state transition probability matrix or the generated at least one other set of HMM state transition probability matrix with at least one spatio-temporal model to obtain at least one integrated model, wherein the spatio-temporal model deploys the digital elevation model, proximity to primary roads, and slope to model urban growth scenario;

predicting LULC changes to generate at least one prediction image; and pruning a socio-economic driver variable from the plurality of socio-economic driver variables by:
 training the defined at least one HMM with all the socio-economic driver variables;
 re-training the defined at least one HMM without the socio-economic driver variable;
 assessing an impact of the socio-economic driver variable; and
 pruning the socio-economic driver variable when the re-trained at least one HMM is same as the trained at least one HMM and the pruned socio-economic driver variable have little impact or no impact on the training of the defined at least one HMM.

2. The method of claim 1, wherein the step of classifying may be preceded by a step of pre-processing the remotely sensed data by a correction method selected from the group consisting of Scan Line Correction, Atmospheric correction and Radio metric correction wherein the pre-processed sensed data is classified initially into classes based on a nature of landscape as a forest canopy, an agriculture area, a residential area, an industrial area, a common open area, a burnt grass, a bright soil and a water body, wherein a set of pixels for each class are collected and a feature vector for each pixel consists of all the classified landscapes.

3. The method of claim 1, wherein classifying the remotely sensed data into the plurality of LULC comprises classifying the remotely sensed data into landscape based classes.

4. The method of claim 1, comprising mean normalizing the data corresponding to the plurality of socio-economic driver variables and the data corresponding to a plurality of scenario based temporal variables to a uniform scale between 0 and 1.

5. The method of claim 4, wherein the mean normalized data is stored as the Gaussian distributions in the database.

6. The method of claim 1, wherein the step of integrating comprises providing data from the generated at least one HMM transition matrix or the generated at least one other HMM transition matrix to a spatio-temporal modeler module, wherein the spatio-temporal modeler comprises at least one spatio-temporal model.

7. The method of claim 1, wherein the step of predicting comprises generating a prediction image obtained by executing the obtained integrated model.

8. The method of claim 1 further comprising:
 training the defined HMM without at least one socio-economic driver variable to generate at least one pruned HMM transition matrix;
 comparing the generated at least one pruned HMM transition matrix with the generated at least one HMM transition matrix obtained from training the defined HMM with LULC as hidden states and socio-economic driver variables as observations; and
 pruning the at least one socio-economic driver variable for a subsequent training of the defined HMM, when the generated at least one pruned HMM transition matrix is identical to the generated at least one HMM transition matrix.

9. A system comprising:
one or more processors;
a communication interface device;
one or more internal data storage devices operatively coupled to the one or more processors for storing, wherein the one or more processors are configured to:
classify remotely sensed data received for a pre-defined interval of time from a plurality of sensors into a plurality of land use land cover classes (LULC) as Vegetation (V), Impervious Surface (I), and Soil (S);
provide data corresponding to a plurality of socio-economic driver variables for a pre-defined interval of time from a database, wherein the plurality of socio-economic driver variables include a Gross Domestic Product of a scale as national, an Interest Rate Cycle of a scale as national, a Consumer Price Index Inflation of a scale as national, a Gross Fixed Capital Formation of a scale as national, an Urban Population Growth Rate of a type social and a scale as national, a Per Capita Electricity Consumption of a scale as regional, a Total Road Length Added of a scale as regional;
define at least one Hidden Markov Model (HMM) with the plurality of LULC classes of V, I, S as hidden states and plurality of socio-economic driver variables as observations, wherein each of the socio-economic driver variables is modeled as a Gaussian distribution with a mean and a standard deviation, and each Gaussian distribution is divided into quartiles;
train the defined at least one HMM with data for the plurality of LULC classes of V, I, S as hidden states and the data corresponding to plurality of socio-economic driver variables as observations from the database for generating at least one HMM state transition probability matrix wherein a plurality of transition sub-models are defined for land cover change types as V to S, V to I, I to V, I to S, S to V, S to I excluding transitions from or to water states and a digital elevation model, road layers are used as a driver variable for each of the transition sub-models, wherein the driver variables are transformed to respective evidence likelihood based transition potential images and fed into a spatio-temporal model to yield a consolidated potential transition image for each of the land cover change types;
generate data corresponding to a plurality of scenario based temporal variables related to future growth scenarios, steady or negative economic growth, or recession and storing the data corresponding to a plurality of scenario based temporal variables in the database, wherein the plurality of scenario based temporal variables are defined in terms of quartile numbers, and data values for the scenario are created by generating random numbers from the specified quartiles of the socio-economic driver variables;
train the defined at least one HMM with data for the plurality of LULC classes of V, I, S as hidden states and the data corresponding to a plurality of scenario based temporal variables from the database as observations for generating at least one other set of HMM state transition probability matrix;

integrate the generated at least one HMM state transition probability matrix or the generated at least one other set of HMM state transition probability matrix with at least one spatio-temporal model to obtain at least one integrated model, wherein the spatio-temporal model deploys the digital elevation model, proximity to primary roads, and slope to model urban growth scenario;

predict LULC changes to generate at least one prediction image; and prune a socio-economic driver variable from the plurality of socio-economic driver variables by:
training the defined at least one HMM with all the socio-economic driver variables;
re-training the defined at least one HMM without the socio-economic driver variable;
assessing an impact of the socio-economic driver variable; and
prune the socio-economic driver variable when the re-trained at least one HMM is same as the trained at least one HMM and the pruned socio-economic driver variable have little impact or no impact on the training of the defined at least one HMM.

10. The system of claim 9 configured to pre-process remotely sensed data received for a pre-defined interval of time from a plurality of sensors by a correction method selected from the group consisting of Scan Line Correction, Atmospheric correction and Radio metric correction, wherein the pre-processed sensed data is classified initially into classes based on a nature of landscape as a forest canopy, an agriculture area, a residential area, an industrial area, a common open area, a burnt grass, a bright soil and a water body, wherein a set of pixels for each class are collected and a feature vector for each pixel consists of all the classified landscapes.

11. The system of claim 9 configured to:
train the defined HMM without at least one socio-economic driver variable to generate at least one pruned HMM transition matrix;
compare the generated at least one pruned HMM transition matrix with the generated at least one HMM transition matrix obtained from training the defined HMM with LULC as hidden states and socio-economic driver variables as observations; and
prune the at least one socio-economic driver variable for a subsequent training of the defined HMM, when the generated at least one pruned HMM transition matrix is identical to the generated at least one HMM transition matrix.

12. A computer program product comprising a non-transitory computer readable medium having a computer readable program embodied therein, wherein the computer readable program, when executed on a computing device, causes the computing device to:
classify remotely sensed data received for a pre-defined interval of time from a plurality of sensors into a plurality of land use land cover classes (LULC) as Vegetation (V), Impervious Surface (I), and Soil (S);
provide data corresponding to a plurality of socio-economic driver variables for a pre-defined interval of time from a database, wherein the plurality of socio-economic driver variables include a Gross Domestic Product of a scale as national, an Interest Rate Cycle of a scale as national, a Consumer Price Index Inflation of a scale as national, a Gross Fixed Capital Formation of a scale as national, an Urban Population Growth Rate of a type social and a scale as national, a Per Capita Electricity Consumption of a scale as regional, a Total Road Length Added of a scale as regional;

define at least one Hidden Markov Model (HMM) with the plurality of LULC classes of V, I, S as hidden states and plurality of socio-economic driver variables as observations, wherein each of the socio-economic driver variables is modeled as a Gaussian distribution with a mean and a standard deviation, and each Gaussian distribution is divided into quartiles;

train the defined at least one HMM with data for the plurality of LULC classes of V, I, S as hidden states and the data corresponding to plurality of socio-economic driver variables as observations from the database for generating at least one HMM state transition probability matrix wherein a plurality of transition sub-models are defined for land cover change types as V to S, V to I, I to V, I to S, S to V, S to I excluding transitions from or to water states and a digital elevation model, road layers are used as a driver variable for each of the transition sub-models, wherein the driver variables are transformed to respective evidence likelihood based transition potential images and fed into a spatio-temporal model to yield a consolidated potential transition image for each of the land cover change types;

generate data corresponding to a plurality of scenario based temporal variables related to future growth scenarios, steady or negative economic growth, or recession and storing the data corresponding to a plurality of scenario based temporal variables in the database, wherein the plurality of scenario based temporal variables are defined in terms of quartile numbers, and data values for the scenario are created by generating random numbers from the specified quartiles of the socio-economic driver variables;

train the defined at least one HMM with data for the plurality of LULC classes of V, I, S as hidden states and the data corresponding to a plurality of scenario based temporal variables from the database as observations for generating at least one other set of HMM state transition probability matrix;

integrate the generated at least one HMM state transition probability matrix or the generated at least one another set of HMM state transition probability matrix with at least one spatio-temporal model to obtain at least one integrated model, wherein the spatio-temporal model deploys the digital elevation model, proximity to primary roads, and slope to model urban growth scenario;

predict LULC changes to generate at least one prediction image; and prune a socio-economic driver variable from the plurality of socio-economic driver variables by:
training the defined at least one HMM with all the socio-economic driver variables;
re-training the defined at least one HMM without the socio-economic driver variable;
assessing an impact of the socio-economic driver variable; and
pruning the socio-economic driver variable when the re-trained at least one HMM is same as the trained at least one HMM and the pruned socio-economic driver variable have little impact or no impact on the training of the defined at least one HMM.

13. The computer program product of claim 12, further configured to:

train the defined HMM without at least one socio-economic driver variable to generate at least one pruned HMM transition matrix;

compare the generated at least one pruned HMM transition matrix with the generated at least one HMM transition matrix obtained from training the defined HMM with LULC as hidden states and socio-economic driver variables as observations; and prune the at least one socio-economic driver variable for a subsequent training of the defined HMM, when the generated at least one pruned HMM transition matrix is identical to the generated at least one HMM transition matrix.

* * * * *